July 8, 1930.  F. L. FURBUSH  1,769,992
CONVEYER
Filed Sept. 26, 1928
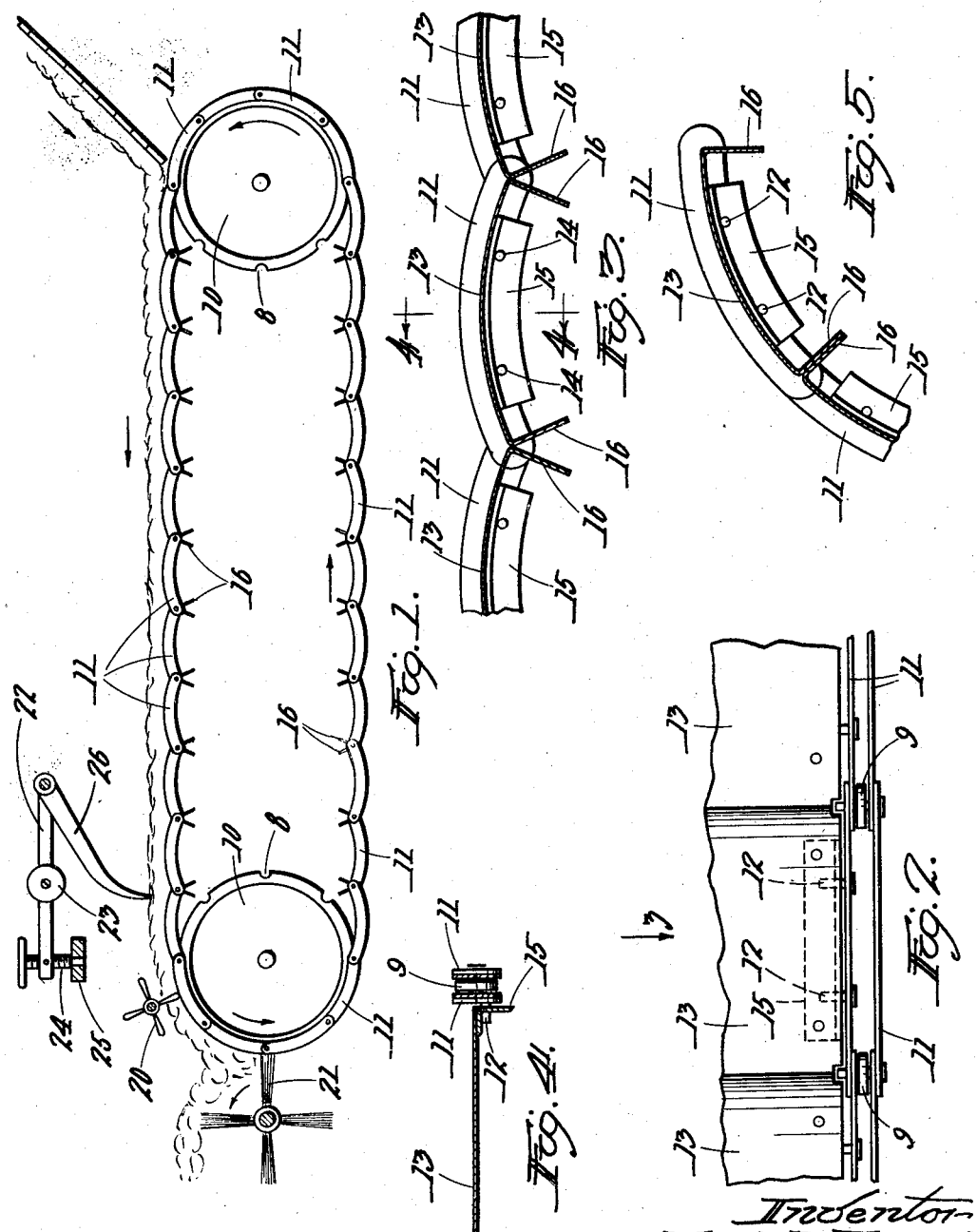

Patented July 8, 1930

1,769,992

UNITED STATES PATENT OFFICE

FRANK L. FURBUSH, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS

CONVEYER

Application filed September 26, 1928. Serial No. 308,418.

This invention relates to a conveyer for sticky or pasty material, adapted to be used in driers especially.

The principal objects of the invention are to provide the plates or shelves of which the conveyer is formed in such a form that they can be very easily removed from the chain without damaging the chains or disconnecting them and replaced just as easily; to provide the shelves in a curved form so that a plurality of them will assume a semi-cylindrical shape where they pass over sprockets so as to provide a smooth surface for contact with a brush or beater to clean them off; to provide the shelves or plates of sheet metal having integral means for stiffening the same and avoid hinging them to the chain so that there will be no hinges or equivalent construction to wear out and cause trouble, thus increasing the durability of this conveyer.

Other objects and advantages of the invention will appear hereinafter.

Reference is to be had to the accompanying drawings in which

Figure 1 is a side view of a conveyer and associated parts constructed in accordance with this invention;

Fig. 2 is a plan of a portion of one side thereof;

Fig. 3 is a sectional view looking in the direction of the arrow 3 in Fig. 2;

Fig. 4 is a sectional view on the line 4—4 of Fig. 3; and

Fig. 5 is a longitudinal sectional view similar to Fig. 3 but showing the position of the plates or shelves as they pass over the sprocket.

Conveyers made in accordance with this invention can be used for many purposes and for conveying many materials but particular advantage is obtained in the conveying of sticky and pasty material which would be apt to stay on conveyer shelves as they pass over the sprockets at the delivery end, the same being combined with means for engaging the material there and removing it.

The conveyer is shown as supported on two pairs of sprocket wheels 10 which support link chains 11, one on each side. The chains are shown as double and provided with loose wheels 9 which engage in depressions 8 in the bases of the sprocket wheels and constitute the sprocket connection for driving the chains. The links are curved to the same curvature as the sprocket wheels. Each link is provided with two pins 12 projecting inwardly and the plates or shelves 13 are supported thereby, the pins passing into perforations 14 in angle irons 15 riveted to the bottom of each shelf at opposite ends.

The object of this construction, these pins constituting the sole support for the shelves 13, is that at a distance from the sprocket the chains can be separated enough to pull the pins out of the perforations 14 and thus remove the shelves and replace them in case of any damage, for the purpose of renewing the conveyer or any of the shelves thereon.

It will be noticed that these shelves 13 are of convex form and they constitute in each case a part of the arc of a circle of the size of the pitch diameter of the sprockets 10. This is for the purpose of causing the conveyer to assume a smooth semi-cylindrical form when passing over the sprockets for a purpose that will appear.

These shelves are formed of sheet metal and each is provided with an integral right angular projection 16 extending inwardly which projections are in radial position with respect to the arc of the curve of the shelf. These projections come in contact with each other in the position shown in Fig. 5 where they pass over the sprocket. The principal object of these projections, however, is to stiffen each of these shelves so that they may be made of comparatively thin sheet metal and still have considerable strength.

The reason for the formation of the plates in a curved form as stated, so that they will have a continuous smooth surface where they pass over the sprockets, is to enable a beater 20 to engage this semi-cylindrical surface and effectually clean it of material that might stick to it and also allow a brush 21 to complete that operation, rotating in the direction of the arrow in Fig. 1 so as to take the material from the face of the conveyer and discharge it or part of it upwardly. On account of this smooth surface, no parts of the conveyer are allowed to pass under the beater and brush without being operated upon by them.

I have shown the conveyer as cooperating with an arm 22 located outside the housing of the drier in which the conveyer is adapted to be used, which is provided with a weight 23 and adjusting screw 24 coming against a stop 25. This arm carries a rake 26, used as usual. This particular feature is not a part of this invention and it is illustrated merely to show one way in which the conveyer is adapted to be used.

With this construction it will be seen that a conveyer for a drier or for any other purpose can be made with its shelves readily removable and replaceable for repairs; that, the shelves not being mounted on pivots, there is very little to wear out in their supporting means and they are made comparatively strong by a very simple and inexpensive means as shown by the projection 16. Furthermore, the conveyer in passing over the sprockets presents a smooth surface which is always at the same distance from the sprocket shaft and therefore presents no irregularities to the beater or brush employed for removing the material from the conveyer.

Although I have illustrated and described only one form of the invention, I am aware of the fact that modifications can be made therein by any person skilled in the art without departing from the scope of the invention as expressed in the claims. Therefore, I do not wish to be limited in this respect, but What I do claim is:—

1. In a conveyer, the combination with a pair of side chains, of a series of sheet metal shelves detachably supported at each end by said side chains, said shelves being of arcuate form, two pairs of sprockets supporting said chains, the curvature of the shelves being formed on a radius equal to the radii of the sprocket wheels, said shelves being provided with integral projections extending radially with respect to the curved shelves so that they become radial to the sprockets when the shelves pass over the sprocket wheels for the purpose described.

2. In a conveyer, the combination with a pair of chains, the links thereof having pivot pins at their ends by which they are pivoted together, each link of each chain having a plurality of pins projecting inwardly therefrom a short distance at points between the pivot pins, of a set of shelves, each having an angle iron at each end underneath provided with the same number of perforations in a vertical part of the same for detachably receiving said pins so that the chains can be detached from the angle irons by moving them away from them laterally, without disassembling the chains.

In testimony whereof I have hereunto affixed my signature.

FRANK L. FURBUSH.